UNITED STATES PATENT OFFICE 2,007,043

METHOD OF KNEADING BUTTER

Paul Feremutsch, Zurich-Altstetten, Switzerland

No Drawing. Application March 10, 1933, Serial No. 660,235. In Germany March 10, 1932

1 Claim. (Cl. 99—13)

Buttermilk, or water and other component parts of the milk present in the buttermilk have to be removed, after the particles of fat having conglomerated, out of freshly churned butter by compressing it, this process being called kneading, and at present is done in vessels subject to atmospheric pressure. The oxygen of the air however, being thus imparted into the butter, is in different respects detrimental to the butter.

In order to obtain as a final product, a butter interspersed with carbon-dioxide, the butter is kneaded, according to the method at hand, in a hermetically closed vessel and in an atmosphere of carbon-dioxide at a pressure greater than atmospheric. In this way I obtain a butter greatly improved in taste, possessing lasting qualities and an increase in retardation of deterioration.

With butter made in an atmosphere of carbon-dioxide, i. e. according to the manner described in my Ser. No. 639,675, the attained complete coagulation of the fat-phase into a granular butter is partially retroactive, which is detrimental to the structure of the butter.

By employing the present method, I can remove the injurious oxygen of air from the pores of freshly churned butter that has been churned under atmospheric pressure, by applying carbon dioxide as an expelling agent and at a pressure greater than atmospheric pressure in a hermetically closed vessel.

I claim:

A method of finishing butter having a fast granulous structure consisting of removing freshly churned butter from buttermilk and placing it in a hermetically closed vessel, and mechanically kneading the butter in an atmosphere of carbon dioxide at a pressure greater than atmospheric for the complete expulsion of oxygen from the pores of the butter.

PAUL FEREMUTSCH.